United States Patent [19]

Minemura et al.

[11] Patent Number: 4,668,591

[45] Date of Patent: May 26, 1987

[54] MAGNETIC SEPARATOR MATRIX OF CUT PIECES OF AN ELONGATED CRYSTALLINE MAGNETIC ALLOY

[75] Inventors: Tetsuroh Minemura; Joo Ishihara; Masaichi Nagai; Takeo Tamamura, all of Hitachi, Japan

[73] Assignee: Hitachi, Ltd., Tokyo, Japan

[21] Appl. No.: 710,240

[22] Filed: Mar. 11, 1985

Related U.S. Application Data

[63] Continuation of Ser. No. 398,240, Jul. 14, 1982, abandoned.

[30] Foreign Application Priority Data

Jul. 24, 1981 [JP] Japan ................................ 56-115212

[51] Int. Cl.⁴ ............................................ B23P 17/06
[52] U.S. Cl. ................................ 428/605; 209/223.1; 210/222; 428/636; 428/928; 420/34; 420/122; 420/123; 420/77
[58] Field of Search ................ 209/223 R; 210/222, 210/223; 55/100; 428/605, 607, 611, 928, 636; 75/123 J, 126 R

[56] References Cited

U.S. PATENT DOCUMENTS

| Re. 20,800 | 7/1938 | Dean | 75/123 J X |
|---|---|---|---|
| 3,567,026 | 3/1971 | Kolm | 210/222 |
| 3,674,467 | 7/1972 | Chalk | 75/126 R |
| 3,902,865 | 9/1975 | Leavenworth, Jr. et al. | 428/605 |
| 4,005,008 | 1/1977 | Oder | 210/222 X |
| 4,116,829 | 9/1978 | Clark et al. | 210/222 X |
| 4,190,524 | 2/1980 | Watson | 210/222 X |
| 4,247,398 | 1/1981 | Mohri | 210/222 |
| 4,298,478 | 11/1981 | Watson et al. | 210/222 X |
| 4,339,508 | 7/1982 | Tsuya et al. | 428/611 X |

FOREIGN PATENT DOCUMENTS

935  1/1971  Japan ................................ 75/123 J

OTHER PUBLICATIONS

Timbrell, V., "Magnetic Separation of Respirable Asbestos Fibres", in *Filtration and Separation*, vol. 14, No. 3 (May/Jun. 1977), pp. 241–242.

*Primary Examiner*—Kathleen J. Prunner
*Attorney, Agent, or Firm*—Antonelli, Terry & Wands

[57] ABSTRACT

A matrix for magnetic separators which comprises wire or ribbon of a crystalline magnetic alloy having a fine-grained structure and a supersaturated solid solution structure.

3 Claims, 12 Drawing Figures

20μm

MAGNETIC SEPARATOR MATRIX OF CUT PIECES OF AN ELONGATED CRYSTALLINE MAGNETIC ALLOY

This is a continuation of application Ser. No. 398,240, filed July 14, 1982 and now abandoned.

This invention relates to a matrix for magnetic separators (hereinafter referred to as matrix).

In general, a magnetic separator comprises a matrix of ferromagnetic material packed in a space defined by an electromagnetic coil or between electromagnets, which matrix is magnetized and waste water is passed through the matrix for seizing particles in the waste water by use of the magnetic attraction thereof. Such magnetic separator has been widely used, for example, to separate and remove iron oxides contained in waste water.

The matrix is desired to have several characteristic features such as great magnetic attraction, a property of permitting the attracted particles to be easily washed away reversely (reverse washing), sufficient rigidity to resist compaction caused by the high pressure of a flow of reverse washing water, excellent resistance to corrosion in water or other similar environments, etc.

As the matrix, there have been used, for example, those produced from ferritic stainless steel wool, as disclosed in U.S. Pat. No. 4,033,864, or those produced from amorphous alloy ribbon of a material prepared by rapidly cooling a molten alloy as disclosed in Japanese Laid-Open Patent Publication No. 130,572/1978.

However, the former type of matrix is disadvantageous in that the matrix material tends to flow away together with discharged water because of the nonuniform length and shape of the fibers and a large number of production steps are required to obtain the matrix, resulting in a higher cost. In addition, because of the low yield strength of the matrix, plastic compression deformation occurs during the abovementioned reverse washing with the result of the raise of pressure for passing water, so that the passing of water becomes impossible (compaction).

On the other hand, the latter type of matrix, which is composed of amorphous alloy ribbon with high strength, causes the problems that the matrix is such a rigid plastic body (i.e., a body in which plastic deformation is caused without occurrence of elastic deformation) that a slight cracking may lead to breaking, and that the matrix is liable to cause hydrogen embrittlement and high temperature embrittlement, and the like.

An object of this invention is to overcome the disadvantages of the prior art and to provide a matrix having high efficiency is separating magnetic substances which matrix is made of wire or ribbon having high strength and a uniform shape.

According to this invention, the abovementioned object can be achieved by a matrix comprising crystalline wire or ribbon which is prepared directly from a molten alloy by solidifying the molten alloy through rapid cooling.

The method for soldifying a molten alloy by rapid cooling may be any one of various well-known methods. For example, a method of jetting a molten alloy onto the surface of a cooling substrate (e.g., a drum) being rotated at high speed or a method of cooling a molten alloy by contacting it with a cooling medium (e.g., water or an oil) may be used. Specifically, the single roll method shown in Journal of Japanese Metal Society Vol. 8 in 1978 or U.S. Pat. No. 3,812,901, the twin roll method, the melt instruction method shown in U.S. Pat. No. 3,896,203, the pendant drop method and the like may be utilized. In all of these methods, an elongate material in the form of fine wire or thin ribbon can be produced continuously and directly from a molten alloy by solidifying the alloy through a rapid cooling step.

The molten alloy for use in this invention is not specifically restricted, provided that the alloy is a magnetic alloy. However, in order to enhance the performance of the matrix, the matrix preferably comprises wire or ribbon prepared directly from a molten ferromagnetic alloy. Therefore, the alloy may preferably contain at least one kind of the ferromagnetic transition metals belonging to Group VIII of the Periodic Table as a major component.

In addition, in view of the facts that the matrix is immersed in water and that an acidic solution may be used in the severe washing of the matrix, the wire or ribbon constituting the matrix of this invention preferably contains a corrosion resistance affording metal so as to obtain an improved corrosion resistance in such environment. Examples of the corrosion resistance affording metal include Cr, Mo, W, V and the like.

More preferably, the wire or ribbon constituting the matrix of this invention further contains a solid solution forming element in addition to the Group VIII ferromagnetic transition metal, for minimizing the formation of various kinds of precipitates (namely, to extend the limits of solubility) and for increasing the toughness of the wire or ribbon constituting the matrix of the invention. The solid solution forming elements are classified into two types, that is, substitution type elements and interstitial elements, examples of the former type of elements being Si, Al, Ti, Nb and the like and examples of the latter type of elements being C, B, N and the like.

Accordng to this invention, a melt of a magnetic alloy material containing the abovementioned components is solidified through a rapid cooling step to prepare the wire or ribbon for the matrix directly from the melt. As a result, the wire or ribbon thus prepared can have a fine-grained structure and have a supersaturated solid solution structure in which various kinds of solid solution forming elements are solid-solutioned in a state of supersaturation, and mechanical properties of the wire or ribbon can be enhanced.

The magnetic alloy material consists preferably of 5 to 25 weight % of at least one element selected from the group consisting of Mo, W, V and Cr, 0.05 to 8 weight % of at least one element selected from the group consisting of Si, Al, Ti, Nb, C, B and N and the balance of Fe and inevitable impurities. More preferably, the alloy material consists essentially of, by weight, up to 0.12% of C, up to 1.00% of Si, up to 1.00% of Mn, up to 0.040% of P, up to 0.030% of S, 14.00 to 18.00% of Cr and the balance of Fe and inevitable impurities.

The thus prepared wire for constituting the matrix shows an excellent magnetic substance attracting performance when the wire has a diameter of about 30 to 400 μm. Furthermore, the wire having a saturation magnetization of not less than 80 emu/g is excellent in the magnetic substance seizing performance.

Further features and effects of this invention will become clear from the following descriptions referring to the drawings, in which FIG. 1 is a schematic view of an apparatus used to prepare the ribbon constituting the matrix for magnetic separators of this invention;

This invention will now be explained referring to preferred embodiments.

EMBODIMENT 1

Figure 1:
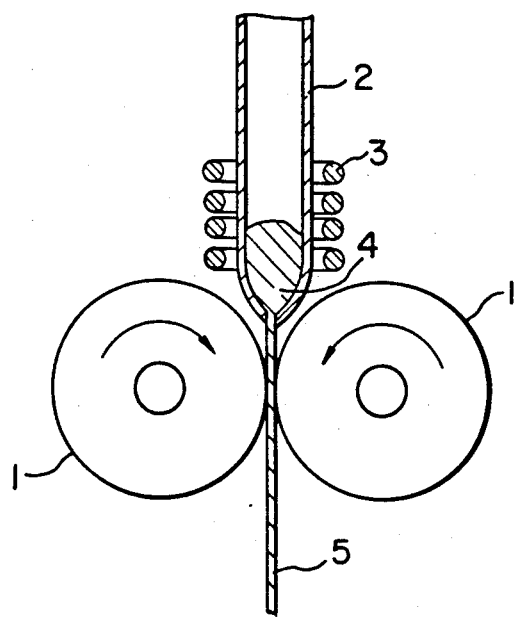

FIG. 1 illustrates the apparatus and process for preparing the ribbon which constitutes the matrix for magnetic separators of this invention. A magnetic alloy 4 consisting essentially of, by weight, 0.10% of C, 0.6% of Si, 0.7% of Mn, 15.6% of Cr, 0.02% of P, 0.01% of S and the balance of Fe and inevitable impurities was inserted in a quartz nozzle 2, then remelted by a high-frequency heating means 3, and the temperature of the molten magnetic alloy 4 was kept in a temperature range of about 1400° to about 1600° C. which is higher than the melting point of the alloy by 100° to 200° C. While applying an argon gas pressure of 2 to 3 Kg/cm² to the molten alloy, the molten alloy was jetted from the nozzle tip hole of 0.2 mm in diameter to bring the molten alloy into contact with roll surfaces at the position of minimum clearance defined between both the surfaces of a pair of rotating rolls 1, whereby the alloy was rapidly cooled at a cooling rate of $10^{3°}$ to $10^{6°}$ C./sec and solidified. Each of the rolls 1 was made of a Cu-Be alloy, had a diameter of 120 mm and was rotated at a revolution rate of about 2000 rpm. By the solidification through rapid cooling, a continuous elongate ribbon 5 for matrix about 0.1 mm wide and about 0.05 mm thick and having a fine-grained crystal structure was obtained. A portion of the thus obtained ribbon was cut, and the cut pieces of the ribbon were packed at random in a housing of predetermined dimensions at a packing density by volume (packing ratio) of 1 to 20% to produce a matrix unit. In addition, another portion of the ribbon was cut to a predetermined length and was served to tests for evaluating the mechanical properties and corrosion resistance of the ribbon. The packing density by volume (packing ratio) described above is defined as the percentage of the volume of the ribbon to the volume of a predetermined space, with the volume of the ribbon being calculated from the cross-sectional area, length, specific gravity and weight of the ribbon.

The results of measurement of yield strength, tensile strength and Vickers hardness of the ribbon constituting the matrix are shown in Table 1, together with the results for steel wool consisting of the above-mentioned magnetic alloy components which was prepared by a conventional cutting method used in the preparation of a matrix material. The tensile strength was measured on an Instron type tension tester with a rate of strain of $1.7 \times 10^{-4}$/sec, while the Vickers hardness was measured on a Micro-Vickers hardness tester with a load of 50 g.

TABLE 1

| Material | Yield strength (Kg/mm²) | Tensile strength (Kg/mm²) | Vickers hardness (DPN) |
| --- | --- | --- | --- |
| Material Prepared by the Method of the Present Invention | 65 | 80 | 210 |
| Material Prepared by the Conventional Method | 40 | 75 | — |

It is seen from Table 1 that the material according to this invention has a superior strength as compared to that of the material produced by the prior art. This is considered to be due to resultant supersaturated solid solution and the refining of the crystal grains to a grain diameter of 0.1 to 50 μm by the solidification through rapid cooling.

EMBODIMENT 2

Using the same apparatus and method as in Embodiment 1, ribbons having a width of 10 mm and a thickness of 0.05 mm were produced respectively from Fe-17%Cr magnetic alloy and from other magnetic alloys prepared by adding Si, Nb, Ti or Al to the Fe-17%Cr magnetic alloy. Each of the ribbons for the matrix was cut to a length of about 2 cm, and after polishing the surface of the cut piece of ribbon a copper wire soldered to the cut piece and the surface was coated with a resin, leaving a surface area of 0.2 cm² uncoated. The thus obtained specimen was immersed in a solution, and the polarization curve for the specimen was measured by using a Pt electrode as a counter electrode and a Ag-/AgCl electrode as a reference electrode. In each measurement, the polarization potential scanning speed was 1.67 mV/sec. FIGS. 2 to 5 show the results of the measurement of anodic polarization curves for evaluating the corrosion resistance of the specimens obtained above.

Figure 2:
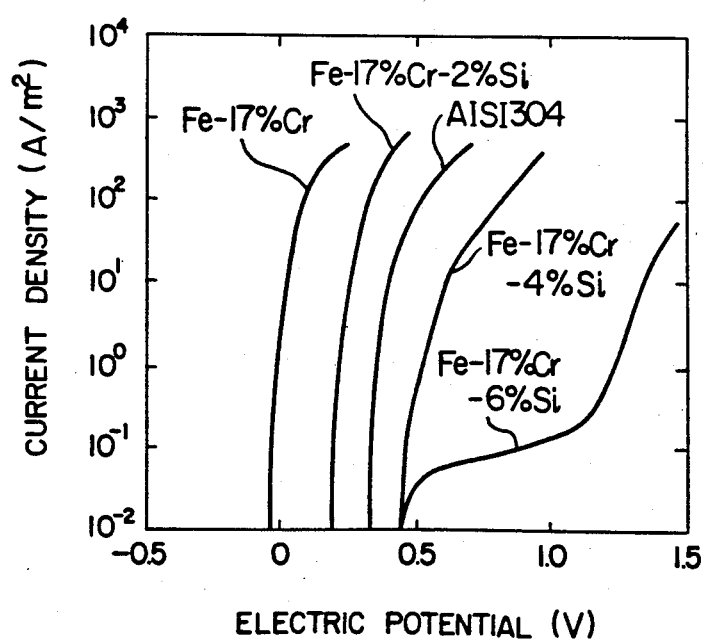
FIG. 2 is a graph showing an anodic polarization curve for use in evaluation the corrosion resistance of Fe-17%Cr alloy which is a matrix material, and also showing the effect of Si contained in the alloy upon the anodic polarization curve.

FIG. 2 shows the effect of the amount of Si on variation in the polarization curve for the Fe-17%Cr alloy in an aqueous 3% HCl solution at 20° C. By way of comparison, the polarization curve for a ribbon of AISI 304 stainless steel prepared by the same apparatus and method as in Embodiment 1 is also shown in FIG. 2. The Fe-17%Cr alloy used here contained substantially the same impurities as those in the Fe-Cr alloy mentioned in FIG. 1 and, therefore, the Fe-17%Cr alloy may be considered to be substantially the same material as the alloy mentioned in Embodiment 1. The polarization curve for the Fe-17%Cr alloy is of such a type as to cause the occurrence of pitting corrosion, which curve is deviated toward a nobler potential with the increase of the amount of Si added, and, by Si addition of 4%, the polarization curve is on the nobler side of the curve for AISI 304 alloy which is an anstenitic stainless steel. Furthermore, with the Si addition of 6%, pitting corrosion does not occur and only an increase of current density in a over-passive state region takes place. As a result, it has been found that the corrosion resistance of the Fe-17%Cr alloy is remarkably improved when a large amount of Si is added to the alloy, and the addition of Si in an amount of at least 4% makes the corrosion resistance larger than that of AISI 304 stainless steel.

Figure 3:
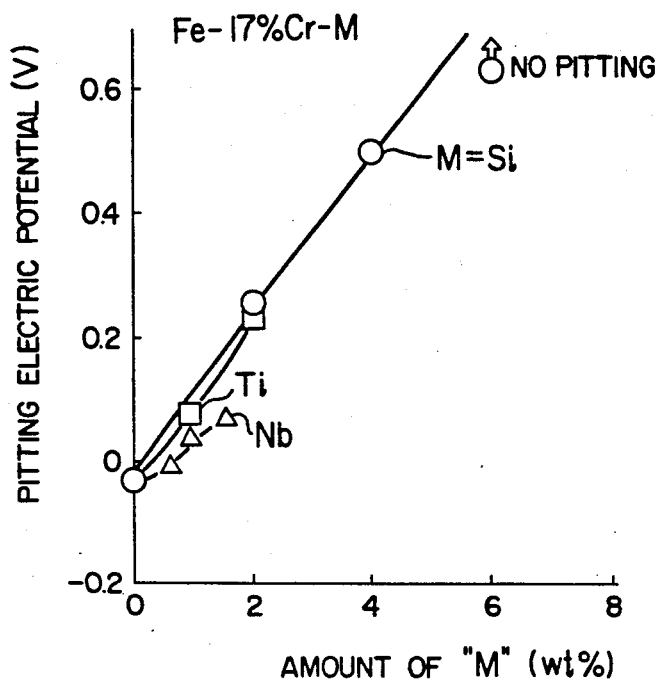
FIG. 3 is a graph showing the effects of Ti, Nb and Si upon the pitting potential for the Fe-17%Cr alloy.

FIG. 3 shows the effects of Ti, Nb or Si added to the Fe-17%Cr alloy upon the pitting corrosion potential. The pitting corrosion potential means the potential at a current density of 1 A/m² which is commonly used. It has been found that the pitting corrosion potential is increased by the addition of any one of these elements and, particularly, the addition of Ti is very effective for improving the corrosion resistance, as well as the addition of Si.

Figure 4:
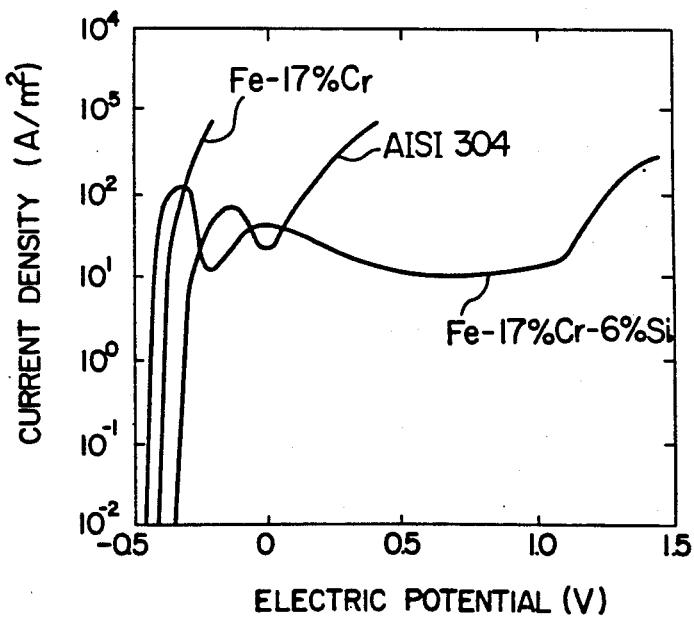
FIG. 4 is a graph showing the polarization curve for Fe-17%Cr-6%Si alloy superior in pitting resistance, which alloy is a satisfactory material for constituting the matrix, in an aqueous HCl solution.

FIG. 4 shows the polarization curve for a specimen of Fe-17%Cr-6%Si alloy of excellent corrosion resistance, measured in an aqueous 1N HCl solution at 20° C. For comparison, FIG. 4 also shows the polarization curves for specimens of Fe-17%Cr alloy and AISI 304 alloy. As is seen from FIG. 4, while the Fe-17%Cr alloy and AISI 304 stainless steel underwent rapid pitting corrosion in the HCl solution, the Fe-17%Cr-6%Si alloy was passivated (i.e., charge to a passivated or chemically inert state) although the current density was slightly higher. Accordingly, it has been found that the Fe-17%Cr-6%Si alloy exhibits a superior corrosion resistance, as compared to those of conventional ferritic or anstenitic stainless steels.

Figure 5:
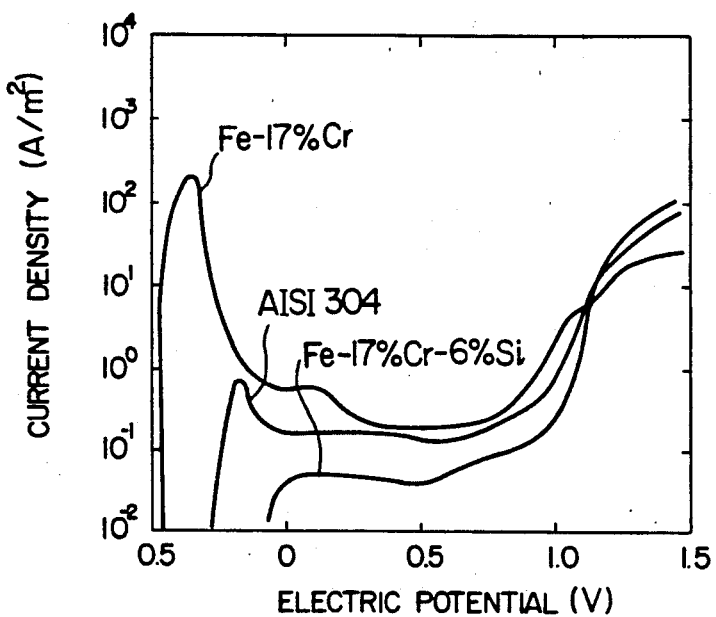
FIG. 5 is a graph showing the polarization curve for the Fe-17%Cr-6%Si alloy in a solution of $H_2SO_4$.

FIG. 5 shows the polarization curve for Fe-17%Cr-6%Si alloy in an aqueous 1N $H_2SO_4$ solution at a temperature of 20° C., together with the curves for Fe-17%Cr alloy and AISI 304 stainless steel. The Fe-17%Cr-6%Si alloy showed no remarkable active dissolution in the $H_2SO_4$ solution and had a lower current density in the passive state region, as compared to those of the two other alloys, and was revealed to exhibit the best corrosion resistance in an acid solution.

Figure 6:
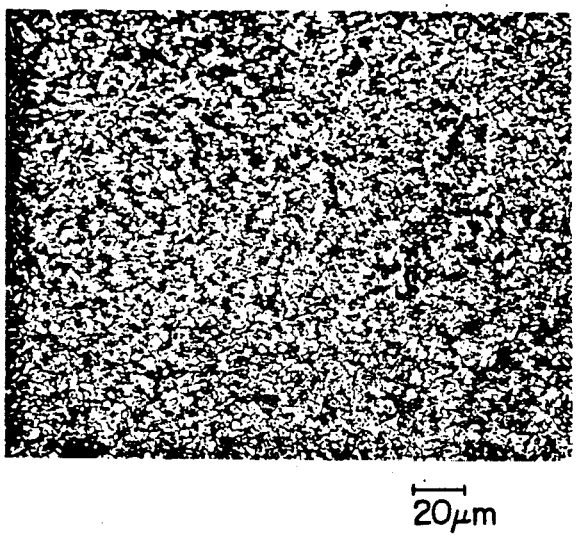
FIG. 6 is a photomicrograph showing the microstructure of the Fe-17%Cr-6%Si alloy.

FIG. 6 is a photograph showing the microstructure of a ribbon for the matrix prepared from Fe-17%Cr-6%Si alloy, which reveals that the ribbon comprises a very fine-grained crystal structure.

EMBODIMENT 3

Each of the alloys of the compositions shown in Table 2 was treated by the same method as in Embodiment 1 to prepare a ribbon of the same shape as in Embodiment 1, and a matrix was produced from the ribbon. The yield strength and Vickers hardness of the thus prepared ribbons were measured as in Embodiment 1. The results are shown in Table 2.

TABLE 2

| Alloy composition (wt. %) | Yield strength (Kg/mm²) | Vickers hardness (DPN) |
| --- | --- | --- |
| Fe—10Mo—2Si | 110 | 320 |

TABLE 2-continued

| Alloy composition (wt. %) | Yield strength (Kg/mm²) | Vickers hardness (DPN) |
| --- | --- | --- |
| Fe—10W—2Si | 140 | 320 |
| Fe—5V—2Si | 90 | 250 |
| Fe—15Cr—2Si | 85 | 265 |
| Fe—20Cr—2Si | 90 | 265 |
| Fe—10Mo—2Al | 100 | 305 |
| Fe—10W—2Al | 115 | 320 |
| Fe—5V—2Al | 70 | 210 |

The matrices in Table 2 contain Mo, W, V or Cr as a corrosion resistance affording element and, further, a little amount of Si or Al which had been added as a substitution type solid solution forming element. From Table 2, it is recognized that all the materials shown in Table 2 have high strength.

EMBODIMENT 4

Alloys of various compositions were prepared by adding 1 to 8weight % or Nb, Ti, Al or Si as a substitution type solid solution forming element M to Fe-20 wt%Cr alloy. Each of the thus prepared alloys was melted, and then a crystalline ribbon was prepared from the molten alloy by rapidly cooling the molten alloy according to the same method as in Embodiment 1, then a matrix being produced from the ribbon with the yield strength of the ribbon being measured. The results are shown in FIG. 7.

Figure 7:
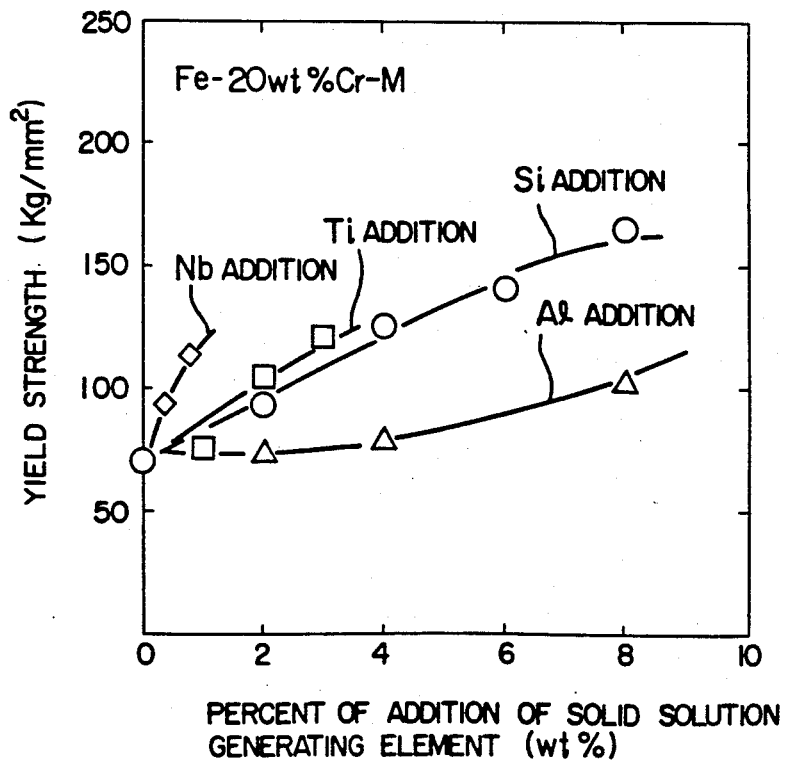
FIG. 7 is a graph showing the relationship between the addition amounts of solid solution forming elements and yield strength for a matrix material.

From FIG. 7 it is recognized that the yield strength increases with the increase of the respective addition amounts of Nb, Ti, Al and Si, and this effect is particularly conspicuous in the cases of Ti addition and Si addition. In the prior art, it has been hard to effect working of steels containing 3 weight % or more of Si, with the result that the production of thin wires from such steels has been difficult. In contrast, according to the method of this invention, the steels containing 3 weight % or more of Si can be easily treated to obtain the desired wire or ribbon, and the resultant wire or ribbon has a superior strength and is suitable as a material for producing the matrix for magnetic separators.

TEST EXAMPLE 1

Figure 8:
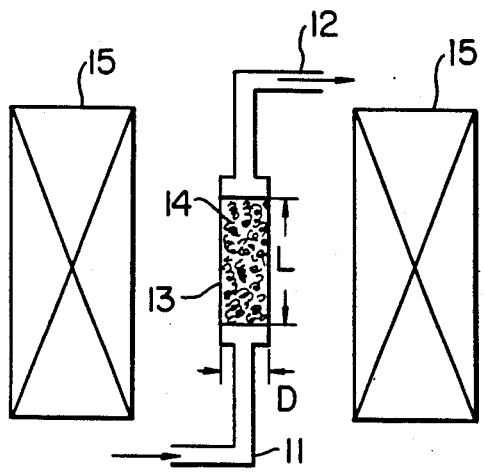
FIG. 8 is an illustration of an apparatus used for measuring the magnetic substance seizing performance of the matrix of this invention.

Regarding matrices made of ribbons of the Fe-20 wt%Cr-2 wt%Si alloy selected from the materials of the present invention shown in Embodiment 3, there were effected tests for measuring the magnetic particle seizing performance. Namely, as shown in FIG. 8, the ribbon-shaped specimen 14 about 0.05 mm thick and about 10 mm wide was packed at random in a column 13 equipped with a water supply pipe 11 and a water discharge pipe 12, and while applying a magnetic field by electromagnets 15, water containing $Fe_3O_4$ fine particles is passed upward through the column, followed by a gravimetric analysis of the residual $Fe_3O_4$ content of the discharged water. In this case, the packing density by volume (packing ratio) was 5%. The test conditions were such that the $Fe_3O_4$ concentration in the feed water was 100 mg/l, the linear velocity of water being 280 m/h, the column diameter being D=25 mm and the column length being L=150 mm.

Figure 9:
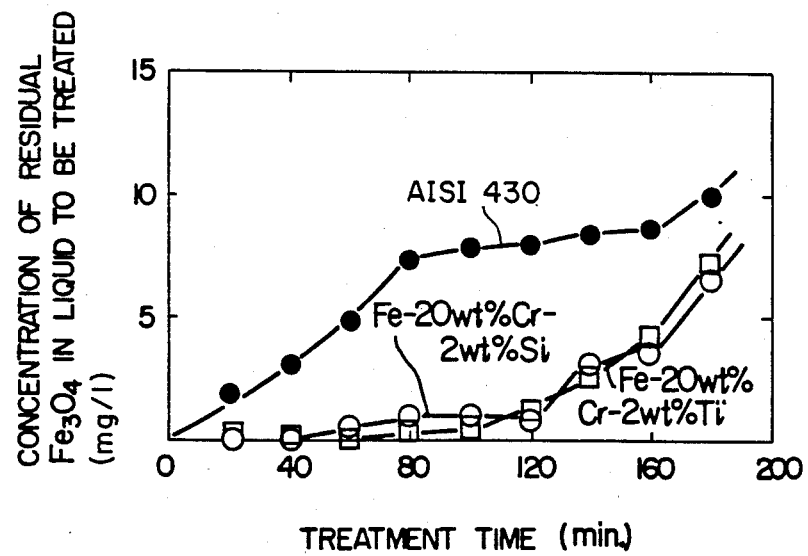
FIG. 9 is a graph showing the test results obtained by using the apparatus shown in FIG. 8.

The test results are shown in FIG. 9, in which is also shown similar results obtained with a conventional material (AISI 430 wool prepared by a cutting method) as comparative example. It is seen from FIG. 9 that with the Fe-20 wt%Cr-2 wt%Si alloy used as the matrix material, the residual $Fe_3O_4$ concentration in the treated water was kept in the range of 0 to about 1 mg/l regarding the treating period of time up to 120 min., which indicates that most of the $Fe_3O_4$ particles were seized and separated from the water by the matrix. On the other hand, when the conventional material was used, an outflow of 10 mg/l of $Fe_3O_4$ particles has already taken place during the same period of time as above. Accordingly, it is confirmed that the material according to this invention is by far superior to the conventional material in magnetic particle seizing performance.

TEST EXAMPLE 2

Figure 10A:
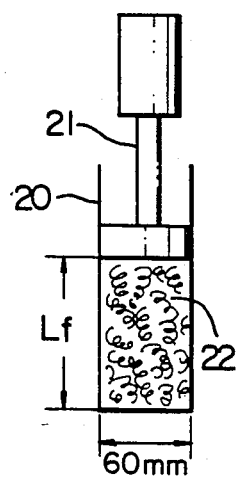
FIG. 10A is an illustration of an apparatus used for measuring the compaction resisting property of the matrix of this invention.
Figure 10B:
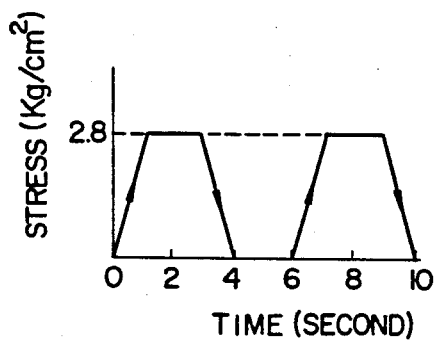
FIG. 10B is a diagram showing the compression cycle in the test carried out by using the apparatus shown in FIG. 10A.

Regarding matrices made of ribbons of the Fe-20 wt%Cr-4 wt%Si alloy selected from the materials of this invention in Embodiment 4, there were effected tests for measuring the compaction resisting performance. Namely, by using a device provided with a cylinder 20 and a hydraulic piston 21 as shown in FIG. 10A, a matrix specimen 22 packed in the cylinder was periodically compressed by the piston and the packed thickness Lf of the matrix was measured for various numbers of times of compression. In the test, the packing density by volume (packing ratio) of the matrix before compression is 5%, Lf=50 mm, the maximum piston pressure being 28 Kg/cm², the inside diameter of cylinder being 60 mm, and the compression cycle is shown in FIG. 10B.

Figure 11:
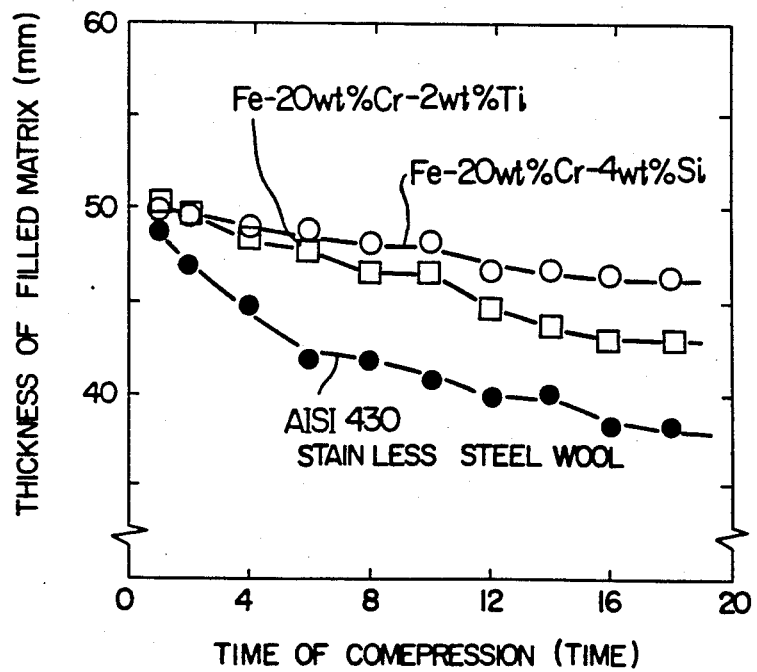
FIG. 11 is a graph showing the variation in thickness of the matrix during the test carried out using the apparatus shown in FIG. 10A.

The test results are shown in FIG. 11, together with the similar results obtained with a conventional material (AISI 430 stainless steel wool produced by a cutting method). As is recognized in FIG. 11, the thickness of the matrix constituted by a conventional material decreases with an increase in the number of times of compression and, after about 16 times of compression, the matrix thickness has already been reduced to about 80% of the initial thickness thereof due to compaction. This is a serious problem with respect to the utility of the matrix, because compaction causes an increase in the resistance against the flow of water or causes such fear that the passing of water becomes impossible, in a case of large degree of compaction. On the other hand, when the Fe-20 wt%Cr-4 wt%Si and fe-°wt%Cr-2 wt%Ti alloys of this invention are used, the thickness of the matrix is reduced only slightly in spite of the increase in the number of times of compression, and the compaction resisting performance of the matrix is remarkably larger than that of the conventional material.

As has been described above, the ribbon or wire constituting the matrix according to this invention is a crystalline material prepared directly from a molten alloy by rapid cooling, and is excellent in magnetic substance separating performace and also in various kinds of strength such as tensile strength, yield strength, etc. In addition, even if alloys are poor in workability, such alloys can be readily formed into wire or ribbon according to this invention, and the matrix produced from such wire or ribbon according to the invention has excellent resistance to hydrogen embrittlement and high temperature embrittlement as well as excellent compaction resistance.

What is claimed is:

1. A matrix for magnetic separators, consisting of a plurality of cut pieces of an elongated material having a cross-sectionally small size and a longitudinally predetermined relatively long length, said material being a crystalline magnetic alloy having a fine-grained, supersaturated solid solution structure with each crystal grain being in the range of 0.1 to 50 μm in size, said crystalline magnetic alloy having a saturation magnetization of not less than 80 emu/g, said crystalline magnetic alloy consisting essentially of: 5–25 wt % of at least one element selected from the group consisting of Cr, Mo, W and V; 0.05–8 wt % of at least one element selected from the group consisting of Si, Al, Ti, Nb, C, B and N; and the balance Fe.

2. The matrix according to claim 1, wherein the crystalline magnetic alloy consists, by weight, up to 0.12% of C, up to 1.00% of Si, up to 1.00% of Mn, up to 0.040% of P, up to 0.030% of S, 14.00 to 18.00% of Cr and the balance being Fe and inevitable impurities.

3. The matrix according to claim 1, wherein the elongated material is a wire having a diameter of about 30 to 400 μm.

* * * * *